Aug. 25, 1936.                    W. W. SHAVER                    2,052,254

IMPROVED GLASS TEMPERING METHOD

Filed Dec. 26, 1934

INVENTOR.
WILLIAM W. SHAVER
BY Dorsey & Cole
ATTORNEYS.

Patented Aug. 25, 1936

2,052,254

UNITED STATES PATENT OFFICE 2,052,254

IMPROVED GLASS TEMPERING METHOD

William W. Shaver, Corning, N. Y., assignor to Corning Glass Works, Corning, N. Y., a corporation of New York Application December 26, 1934, Serial No. 759,263

9 Claims. (Cl. 49—89)

This invention relates to tempering glass, and more particularly to chilling baths such as are frequently employed in tempering processes.

It is well known that the strength of glass can be increased by subjecting it to a tempering process consisting in heating the glass to a high temperature corresponding to that at which it commences to soften, and immediately thereupon chilling it. According to the known processes, this chilling is performed by immersing the hot glass in a liquid bath, or subjecting it to the chilling action of air or other suitable chilling media.

Experience has shown that the surfaces of glass articles when chilled in liquid baths may have objectionable appearing surfaces after chilling, due presumably to unlike changes in the optical properties of the glass in different portions of the article. I ascribe this condition to unequal cooling over the surface of the glass article during immersion in the chilling bath. The lack of uniform optical properties of the glass article, and more especially as applies to its surfaces, detracts from its commercial value in many instances. It is very desirable and important, for example, that high grade plate glass does not have its optical properties impaired when it is strengthened by tempering. Tempered glass sheets in which the optical properties have been non-uniformly changed throughout their area are undesirable for use as windshields and windows for obvious reasons.

Since, from the above, uniform tempering is shown to be desirable, it becomes necessary to attain the desired result by uniformly chilling the article. In order to attain such uniform chilling, it is essential that a uniform cooling be employed and such cooling demands that all parts of the article be treated alike when subjected to the cooling media.

Unless uniform chilling is applied in a glass tempering process, the desired safe maximum degree of temper would be lower, due to possible breakage in processing of over-tempered portions of the article.

Observation has led me to believe that the cause of the afore-mentioned chilling defects is the result of an irregular flow of heat from the glass into the bath, which in turn results in an irregular cooling of the glass so that a non-uniform strain distribution is produced.

The object of this invention is to obtain a uniform temper throughout glass articles.

Among its features my invention embodies a tempering bath in which relative motion is established between the bath and the article being tempered.

Another feature embodies sweeping the surface of the article during its immersion in the bath in order to effect a rapid and uniform transfer of heat from the article to the bath.

Still another feature is the vigorous agitation of the bath both during and after the immersion of the heated glass article which is continued at least until the article has cooled to the strain point of the glass.

Figure 1:
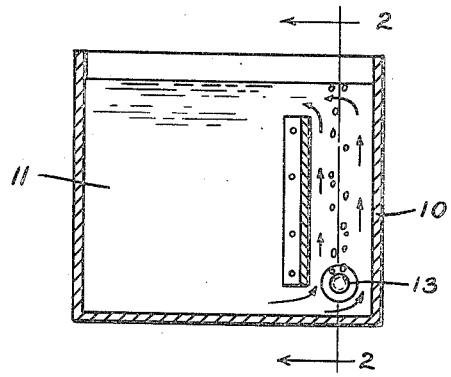
Fig. 1 illustrates a tempering bath in which an air bubbler is employed to produce the desired agitation.
Figure 2:
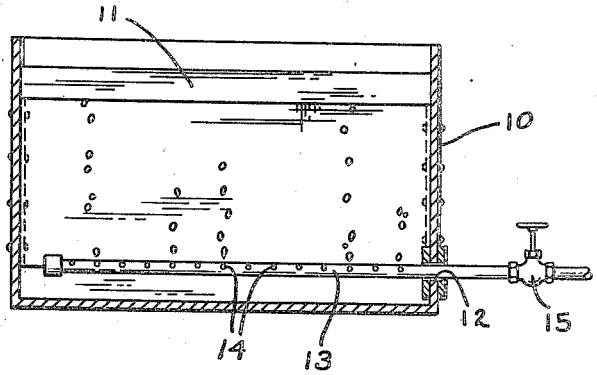
Fig. 2 is a sectional view taken on the line 2—2 of Fig. 1.

Referring to the drawing in detail, a tank 10, containing a tempering bath 11, which may consist of liquefied oil, fat, resin, tar, wax, molten salts, molten metals, or the like, is provided with an opening 12 through which a pipe 13, having perforations 14, is introduced below the level of the bath. The pipe 13 is preferably located near the bottom of the receptacle so that when air under pressure is admitted to the pipe and issues from the perforations 14 the bath will be vigorously agitated throughout substantially its entire depth. The pipe 13 is provided with a valve connection 15 to which a suitable source of air pressure (not shown) may be attached.

Figure 3:
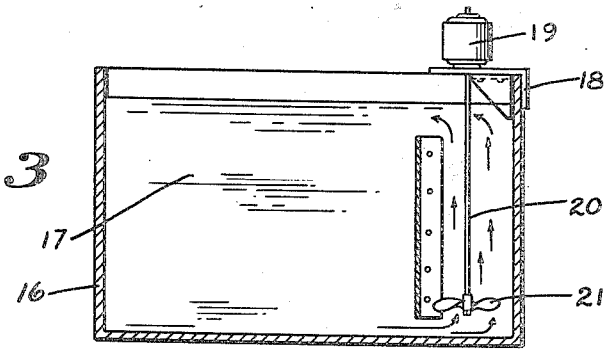
Fig. 3 is a view similar to Fig. 2 in which agitation is accomplished by a suitable impeller.

In the modified form of my invention shown in Fig. 3, a tank 16 containing a liquid tempering bath 17 carries brackets 18 upon which a motor 19 is mounted. As shown the shaft 20 of the motor extends downwardly into the bath and carries an impeller 21 which in the present instance takes the form of a screw propeller, though the type of impeller may be varied to suit varying requirements. When the motor is connected to a suitable source of power the impeller will be set in motion and a circulation and vigorous agitation of the bath 17 will result.

While the agitation of the liquid chilling bath may be produced by mechanical means, such as above described, a simple method of producing agitation of the liquid bath and one which has been successfully used by me is to move the heated glass article to and fro within the chilling bath for a time until the article has been cooled to a temperature at least as low as the strain point temperature of the glass.

By "strain point" temperature, I mean that temperature of the glass below which further permanent stresses cannot be set into the glass by cooling, even though the cooling be extremely rapid.

The important feature in any specific method of liquid agitation adopted in combination with liquid chilling baths is that all parts of the surface of the glass article be completely and uniformly swept by the liquid chilling medium.

While in the foregoing there has been shown and described the preferred embodiment of my invention, it is to be understood that minor changes in the details of construction, combination and arrangement of parts may be resorted to without departing from the spirit and scope of my invention as claimed.

What I claim is:

1. The method of tempering glass articles which includes heating the article to a predetermined temperature and chilling the article in a vigorously agitated liquid bath.

2. The method of tempering glass articles, which includes heating an article to a predetermined temperature and immersing it in a bath which is vigorously agitated both during and after its immersion.

3. The method of tempering glass articles, which includes heating an article to a predetermined temperature, immersing the article in a chilling bath and establishing relative motion between the article and the bath.

4. The method of tempering glass articles, which includes heating an article to a predetermined temperature, immersing the article in a chilling bath and moving the article relative to the bath while it is so immersed.

5. The method of tempering glass articles, which includes heating an article to a predetermined temperature, immersing the article in a chilling bath and sweeping the surface of the article with the bath while it is so immersed.

6. The method of tempering glass articles, which includes heating an article to a predetermined temperature, immersing the article in a chilling bath and moving the bath about the article while it is so immersed.

7. A process of tempering glass sheets and other glass articles which consists in heating the glass to a temperature at which it commences to soften, thereupon immersing the glass into a liquid bath of lower temperature and imparting a vigorous agitation to the liquid bath at the moment the glass is immersed and during the whole time it is held in the bath.

8. A process of tempering glass sheets and other glass articles which consists in heating the glass to a temperature at which it commences to soften, thereupon immersing the glass into a liquid bath of lower temperature, and imparting a vigorous agitation to the liquid bath by means of mechanical stirring devices both at the moment the glass is immersed and during the whole time it is held in the bath.

9. A process of tempering glass sheets and other glass articles which consists in heating the glass to a temperature at which it commences to soften, thereupon immersing the glass into a liquid bath of lower temperature, and at the moment of immersing the glass and during the time it is held in the liquid bath introducing therein jets of gas for imparting a vigorous agitation to the liquid.

WILLIAM W. SHAVER.